United States Patent
Zhang et al.

(10) Patent No.: US 12,412,182 B1
(45) Date of Patent: *Sep. 9, 2025

(54) SYSTEMS AND METHODS FOR PROVIDING AN END-TO-END CUSTOMER PORTAL

(71) Applicant: STRIPE, INC., South San Francisco, CA (US)

(72) Inventors: James Zhang, Los Angeles, CA (US); Alexander Thiemann, San Francisco, CA (US); Theodora Chu, Los Altos Hills, CA (US); Jessica Jarvis, San Francisco, CA (US); Evan Kay, San Francisco, CA (US); Robert Coe, San Mateo, CA (US); Vihari Muttineni, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/390,211

(22) Filed: Dec. 20, 2023

Related U.S. Application Data

(63) Continuation of application No. 17/157,601, filed on Jan. 25, 2021, now Pat. No. 11,887,128.

(51) Int. Cl.
| | |
|---|---|
| *G06Q 30/016* | (2023.01) |
| *G06F 9/54* | (2006.01) |
| *G06F 16/955* | (2019.01) |
| *G06Q 30/0601* | (2023.01) |
| *H04L 67/146* | (2022.01) |

(52) U.S. Cl.
CPC ........... *G06Q 30/016* (2013.01); *G06F 9/547* (2013.01); *G06F 16/955* (2019.01); *G06Q 30/0641* (2013.01); *H04L 67/146* (2013.01)

(58) Field of Classification Search
CPC ............ G06Q 30/016; G06Q 30/0641; G06F 16/955; G06F 9/547; H04L 67/146
See application file for complete search history.

(56) References Cited

U.S. PATENT DOCUMENTS

| | | |
|---|---|---|
| 6,321,262 B1 | 11/2001 | Springer |
| 11,715,104 B2 | 8/2023 | Wied et al. |
| 2003/0033524 A1 | 2/2003 | Tran et al. |

(Continued)

OTHER PUBLICATIONS

Plus Media Solutions; "FAB launches innovative 'payment as a platform' service for merchants"; Mar. 2, 2020; Plus Media Solutions (Year: 2020).

*Primary Examiner* — Raven E Yono
(74) *Attorney, Agent, or Firm* — BAKERHOSTETLER

(57) ABSTRACT

Methods and systems for providing an end-to-end full stack customer portal are provided. A customer portal may be configured by a commerce platform based on configuration settings received from a merchant, the configuration settings indicating a set of functions to be provided by the customer portal. Upon receiving a request to generate a portal session, the commerce platform may generate the portal session and a portal session object, the portal session object comprising a uniform resource locator (URL) to provide access to the portal session. The portal session object may be transmitted to the merchant. In response to a portal access request made via the URL, the commerce platform may provide access to the customer portal via the portal session, to a customer who made the portal access request.

20 Claims, 11 Drawing Sheets

(56) References Cited

U.S. PATENT DOCUMENTS

| | | |
|---|---|---|
| 2004/0049589 A1* | 3/2004 | Papanikolaou ......... H04L 67/04 |
| | | 709/229 |
| 2005/0114222 A1 | 5/2005 | Mundy |
| 2005/0131944 A1* | 6/2005 | Patrick ............... G06Q 30/0202 |
| 2016/0301739 A1 | 10/2016 | Thompson |
| 2016/0321636 A1 | 11/2016 | Huh et al. |
| 2017/0019435 A1 | 1/2017 | Toutain et al. |
| 2021/0224145 A1 | 7/2021 | Warmack |
| 2022/0182439 A1 | 6/2022 | Zhou et al. |

* cited by examiner

Update your plan

CURRENT PLAN

Typographic Starter
$10.00 per month

PLANS AVAILABLE

Typographic Starter
$10.00 each per month
1 font & 1 domain

Typographic Growth
$20.00 per month
3 fonts & 5 domains

Typographic Enterprise
$30.00 per month
Unlimited fonts & domains

Update quantity

✓ Current plan

```
{
    "object id": "pts_1G4WaFFogS0BY1OiyH0Ip21g",
    "object name": "billing_portal.session",
    "created": 1579889323,
    "customer ID": "cus_EUG1I1jMANP16V",
    "livemode": true,
    "return_url": "https://myapp.com/user-settings",
    "portal session url":
"https://billing.stripe.com/session/TMBjAXtKtkOjUYB7Nj3DXL6WyeocsJur"
}
```

SYSTEMS AND METHODS FOR PROVIDING AN END-TO-END CUSTOMER PORTAL

CROSS-REFERENCE TO RELATED APPLICATIONS

This application is a continuation of co-pending U.S. patent application Ser. No. 17/157,601, filed on Jan. 25, 2021, the disclosure of which is incorporated by reference herein, in its entirety.

BACKGROUND

Merchants, such as on-line retailers, brick and mortar retailers, service providers, etc., provide their products and services to consumers. One way of providing their products and services includes providing them directly to consumers through, for example, an online store associated with the merchant. That is, a consumer interested in a product sold by a merchant can visit the merchant's website, browse products, and purchase a selected product directly from the merchant.

Today, many merchants use third parties to handle all their customer billing and account management needs such as upgrading, downgrading, or cancelling subscriptions, changing payment method details, and viewing and exporting billing history. Many merchants (e.g., subscription businesses) that utilize third party management services also provide a dashboard that integrates with the third-party services and through which customers may manage their account details. Such dashboards may provide a UI through which customers may access various account management functions. Typically, merchants have to build this dashboard themselves and call various APIs of the third party to invoke any actual functionality. Indeed, every action/function (whether changing plan, canceling subscription etc.) is a different third-party API a merchant has to integrate with. Building this dashboard may present a problem for many merchants because it increases the integration effort required to get their business up and running on the third-party service, and requires them to dedicate engineering time on building features that are not core to their products. This problem is unique to any payments or billing provider that has an API-based integration.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3B is a diagram of a subscription management page of a customer portal that is generated by a commerce platform, in accordance with some embodiments of the present disclosure.

FIG. 4B is a diagram of a portal session object, in accordance with some embodiments of the present disclosure.

DETAILED DESCRIPTION

Figure 1:
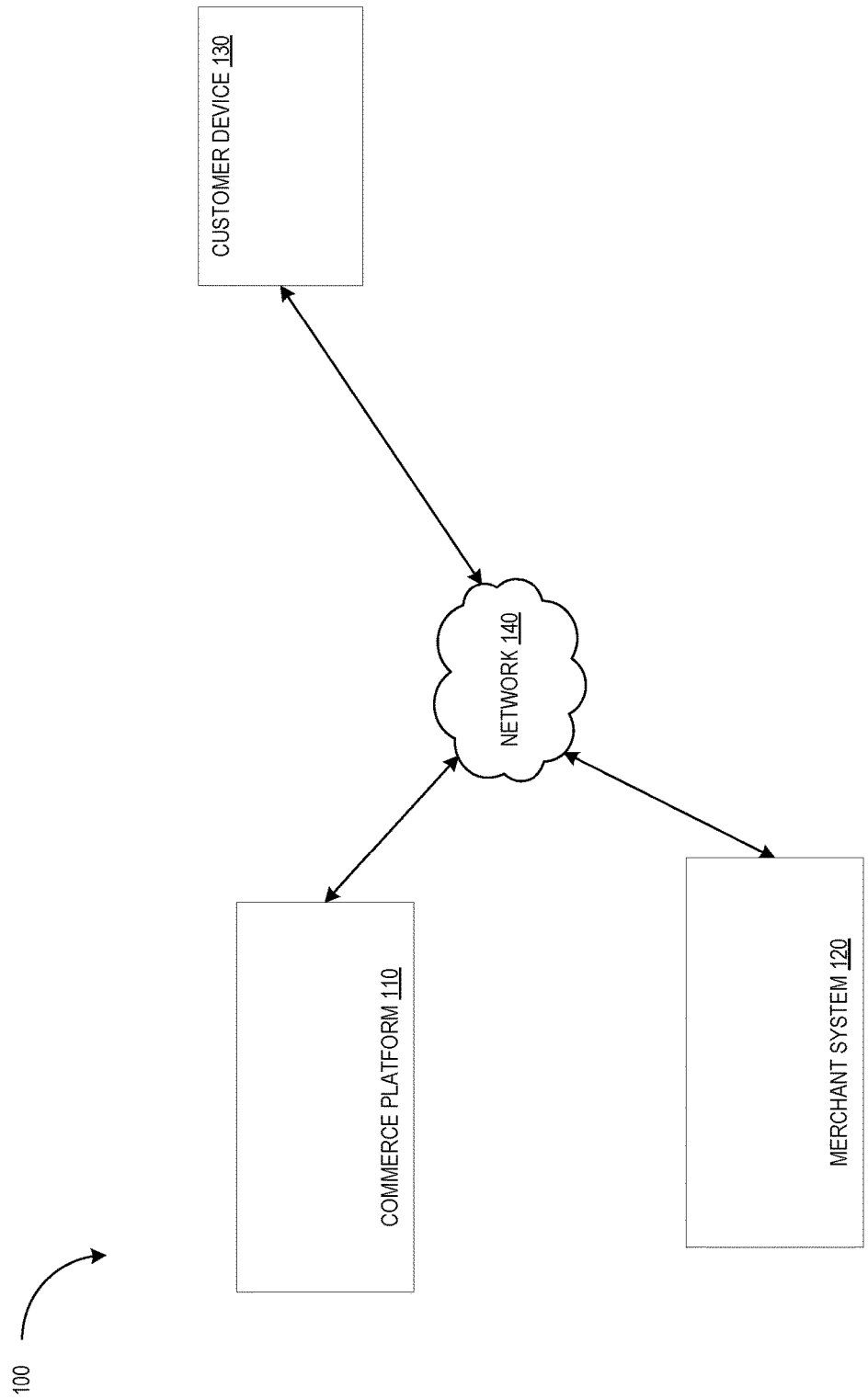
FIG. 1 is a block diagram of an exemplary system architecture for providing an end-to-end full stack customer portal, in accordance with some embodiments of the present disclosure.

The present disclosure is directed to an end-to-end full stack customer portal solution which allows a merchant to configure a customer portal hosted by a commerce platform with the functions and features of a management dashboard. The commerce platform may render a customer portal that is configured with all of the functions and features selected by the merchant and provide a means for customers of the merchant to access respective portal sessions, which may act as limited entry points to the customer portal, thereby providing increased security. Instead of integrating with multiple APIs of the commerce platform, the merchant may call a single API to facilitate access to the customer portal.

In an exemplary embodiment, a method for providing an end-to-end full stack customer portal is provided. The method may comprise configuring a customer portal based on configuration settings received from a merchant, the configuration settings indicating a set of functions to be provided by the customer portal. The method may further comprise receiving a request to generate a portal session, the portal session to act as an entry point to the customer portal. In response to receiving the request, the portal session and a portal session object may be generated, the portal session object comprising a uniform resource locator (URL) to provide access to the portal session. The portal session object may be transmitted to the merchant. In response to a portal access request made via the URL, access to the customer portal may be provided to a customer who made the portal access request. The access may be provided via the portal session.

In another embodiment, a commerce platform is provided. The commerce platform may configure a customer portal based on configuration settings received from a merchant, the configuration settings indicating a set of functions to be provided by the customer portal. The commerce platform may further receive a request to generate a portal session, the portal session to act as an entry point to the customer portal. In response to receiving the request, the commerce platform may generate a portal session and a portal session object, the portal session object comprising a uniform resource locator (URL) to provide access to the portal session. The portal session object may be transmitted to the merchant. In response to a portal access request made via the URL, the commerce platform may provide access to the customer portal to a customer who made the portal access request. The access may be provided via the portal session.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "configuring," "receiving", "generating", "transmitting", "processing", "providing", "determining", "accessing", "entering", "utilizing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 for a commerce platform to provide dashboard functionality to customers of a merchant. In one embodiment, the system 100 includes a user device 130, a merchant system 120, and a commerce platform 110. In one embodiment, user device 130 is a desktop computer system or a laptop computer system, etc., although in other embodiments user device 130 may be a mobile computing device, such as a smartphone, tablet computer, smartwatch, etc. The merchant system 120 and commerce platform 110 may also be computing devices, such as one or more server computer systems, desktop computer systems, etc.

In embodiments, there may be more than one user device, more than one commerce platform, and/or more than one merchant system, which may be used with the commerce platform facilitating transactions between the user device and the merchant system. However, to avoid obscuring the present embodiments, the below discussion refers to the commerce platform 110, merchant system 120, and user device 130.

The user device 130, merchant system 120, and commerce platform 110 may be coupled to a network 102 and communicate with one another using any of the standard protocols for the exchange of information. In one embodiment, one or more of the user device 130, merchant system 120, and commerce platform 110 may run on one Local Area Network (LAN) and may be incorporated into the same physical or logical system, or different physical or logical systems. Alternatively, the user device 130, merchant system 120, and commerce platform 110, may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, merchant system 120 provides a digital marketplace which offers the sale of physical products or digital products and services (e.g., on a subscription basis), etc. which are collectively referred to herein as "products," of merchant system 120. That is, merchant system 120 is the supplier of the products consumed by consumer device 130. To this end, merchant system 120 may interact with commerce platform 110, which facilitates transactions and other functionality (e.g., upgrading, downgrading, or cancelling subscriptions, changing payment method details, and viewing and exporting billing history) originating within merchant system 120.

In one embodiment, prior to any transaction for products offered by merchant system 120, merchant system 120 establishes a merchant account with commerce platform 110. As discussed in greater detail below, the merchant account may include one or more of identification data of the merchant, information indicative of the location of the merchant, establishment of credentials enabling commerce platform 110 to access information of merchant system 120 such as customer account information (e.g., subscriptions levels, payment method details, and billing history etc.), product information for all, or a subset, of products offered by merchant system 120 (e.g., stock information, identifiers of individual products, product descriptions, product images, etc.), and financial information for completing transactions to purchase products (e.g., accounting information, tax information, shipping information, etc.).

FIG. 2 illustrates the system 100 in accordance with some embodiments of the present disclosure. The merchant system 120 may include a front-end module 120B which provides a user interface (UI) which a customer (e.g., visiting the merchant system 120 from customer device 130) may use to manage their account and perform other related functions such as upgrading, downgrading, or cancelling subscriptions, changing payment method details, and viewing and exporting billing history. Instead of building a dashboard feature that underlies the UI and must integrate various APIs of the commerce platform 110 to execute such functionality, the merchant system 120 may utilize the configuration module 110A of the commerce platform to configure a customer portal 300 (illustrated in FIG. 3) with the necessary functionality and UI through a dashboard provided by the configuration module 110A. Customers of the merchant system 120 may be provided access to the customer portal 300 as described in further detail herein.

Figure 3A:
FIG. 3A is a diagram of a customer portal comprising a web page generated and hosted by a commerce platform, in accordance with some embodiments of the present disclosure.
Figure 3A:

FIG. 3A illustrates a diagram of the customer portal 300, which may be configured as discussed herein (as shown in FIG. 3A: the customer portal 300 is configured with plan, payment details, billing information, and billing history modification functionality). Customer portal 300 may be a secure web page hosted by commerce platform 110. As can be seen in FIG. 3, the customer portal 300 may provide the necessary functionality and UI to allow a customer to manage their subscription plan, payment details, billing information, and billing history as well as perform other related functions. The merchant system 120 may call a single API (portal API 110B) to initiate the launch of a customer specific instance (hereinafter referred to as a "portal session") of the customer portal 300 for a customer who wishes to manage their account. FIG. 3B illustrates a diagram of a subscription management page 310 of the customer portal 300. As can be seen, the subscription/plan management page 310 includes indications of a customer's current plan (typographic starter) and available plans (including typographic starter, growth, and enterprise). Each of the available plans includes a continue button which can be used to select them (i.e. to update the current plan with them) except the typographic starter plan which is indicated as the current plan.

Figure 2A:
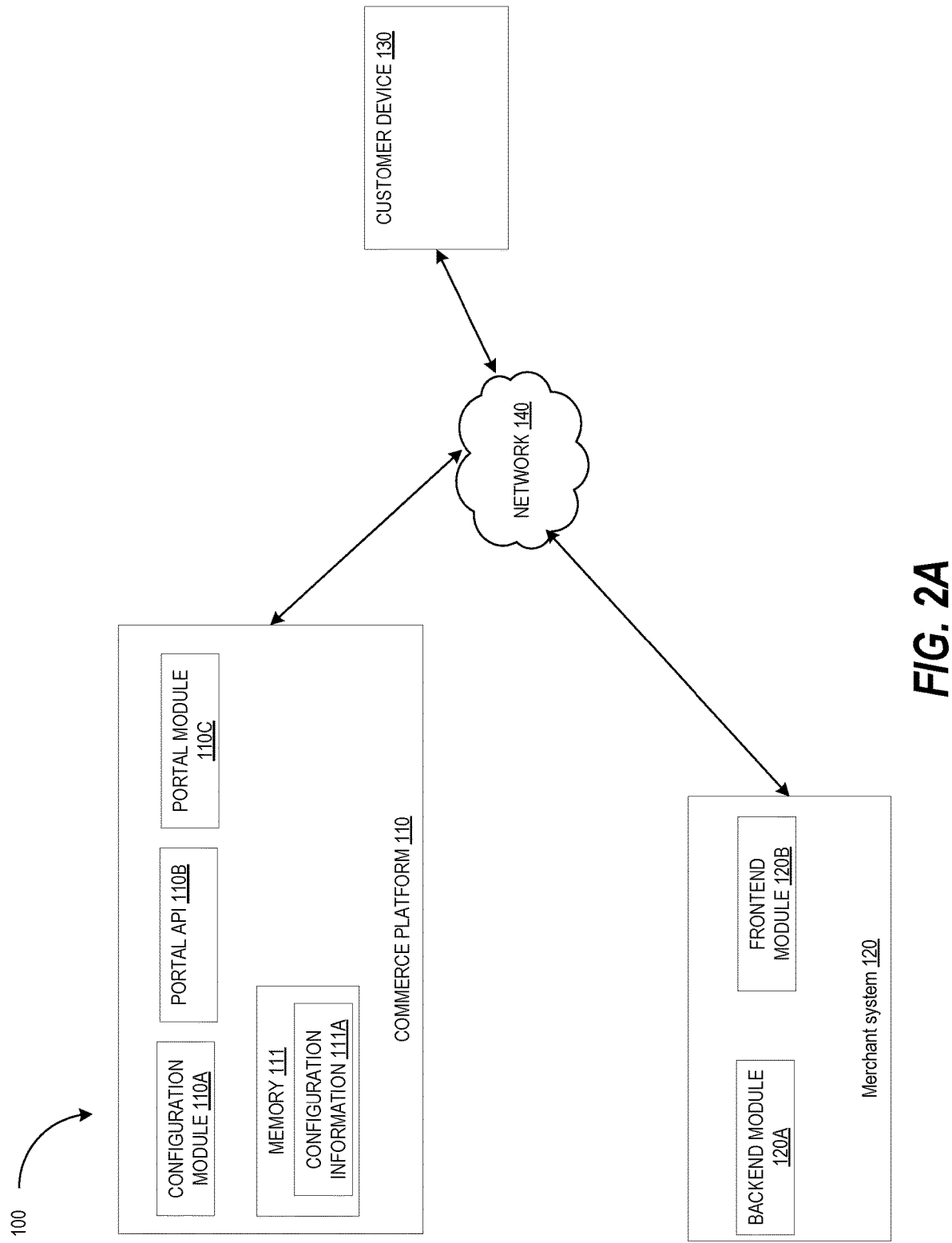
FIG. 2A is a block diagram of an exemplary system architecture for providing an end-to-end full stack customer portal, in accordance with some embodiments of the present disclosure.
Figure 2B:
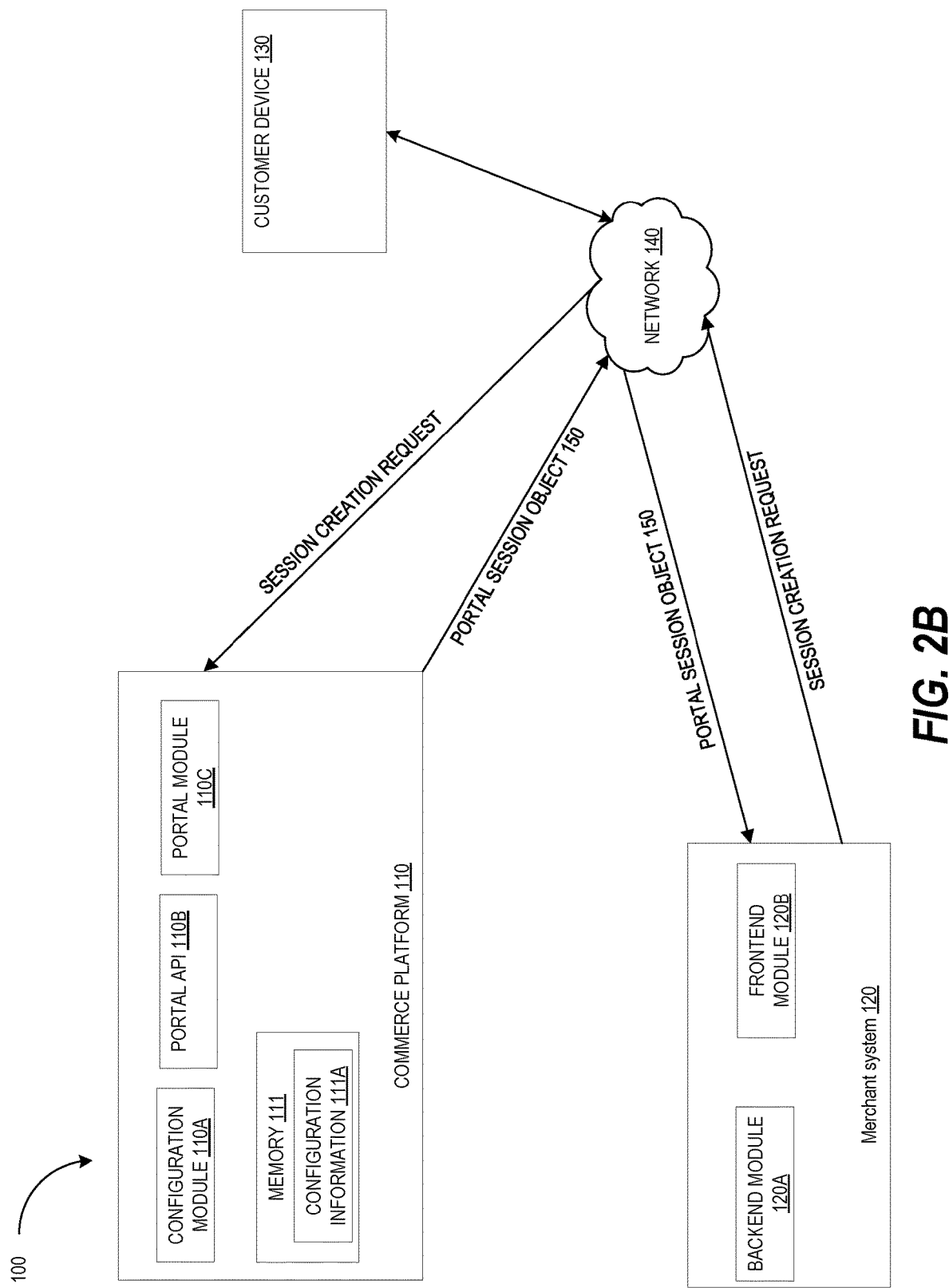
FIG. 2B is a block diagram of an exemplary system architecture for providing an end-to-end full stack customer portal, in accordance with some embodiments of the present disclosure.

Referring to FIGS. 2A and 2B, the configuration module 110A of the commerce platform 110 may provide a dashboard where the merchant system 120 may configure the customer portal 300 with a variety of functionality including subscription plan upgrade or downgrade, enabling of prorations and when to collect payment on prorations (if enabled), whether customers may cancel their subscriptions and if so when such cancellation should be effective (e.g., cancel immediately or at the end of the billing period?), viewing and exporting of their billing history, and viewing, modifying, adding, and deleting their payment methods, for example. The Merchant system 120 may configure the customer portal 300 with all of the available functionality or various subsets of the available functionality based on their business specific requirements. The merchant system 120 may also configure the customer portal 300 with branding and UI settings such as logo, background color, and accent color, as well as links to privacy policy & terms of service, for example. The configuration module 110A may assign these configuration settings 111A a unique configuration ID associated with the merchant 120 and store them in a memory 111 of the commerce platform 110. As will be appreciated, the memory 111 may store the configuration settings for a variety of merchants who have customized their individual customer portals using the configuration module 110A. In some embodiments, once the configuration settings are established by the merchant system 120, they are considered "global" (i.e. merchants cannot override it when instantiating a new portal session instance). In some embodiments, the merchant 120 may utilize a configuration template having pre-set configuration settings and may instantiate portal session instances using the ID of the configuration template used.

As discussed herein, the front-end module 120B may provide a UI which may provide various graphical representations of each function that a customer may utilize such as buttons or links etc. In response to a customer requesting to perform a function (e.g., by clicking or otherwise selecting the function's corresponding graphical representation), front end module 120B may make an API call to backend module 120A, which may make an API call to the portal API 110B requesting initiation of a portal session. In some embodiments, the backend module 120A may use a POST request to call the portal API 110B. The POST request may be a route that matches a web request sent by a customer to some code in the portal API 110B that tells the portal API 110B what data to send back to the customer. The backend module 120A may include in the request to create a portal session a customer ID of the customer who wants to manage their account and a return URL, which may be the URL the customer will be redirected to upon completing their business in the customer portal 300 (e.g., in response to clicking an "exit" button while in the customer portal 300). In some embodiments, the merchant system 120 may provide a default return URL as part the configuration settings 111A they specify through configuration module 110A as discussed herein.

A portal session may act as an entry point into the customer portal 300, and may have a limited duration (i.e., may expire after a pre-set amount of time). A portal session may provide a way for customers to access the customer portal 300 in a constrained way to promote security as discussed in further detail herein. The portal API 110B may act as a single endpoint that (in response to receiving the request to create a portal session) creates the portal session as well as generates and returns a portal session object 150 corresponding to the portal session to the backend module 120A. The portal API 110B may extract the customer ID and the return URL (if specified) from the request and generate the portal session the portal session object 150 based at least in part on the customer ID and the return URL (if specified). In some embodiments, the portal session may be a database model having a schema 400 as indicated in FIG. 4A.

Figure 4A:
FIG. 4A is a diagram of a schema for a portal session, in accordance with some embodiments of the present disclosure.

As shown in FIG. 4A, the schema 400 may include standard properties such as a merchant ID, livemode (e.g., a Boolean value), and timestamps for when the portal session was created and when it was updated. The livemode property may refer to the environment in which API objects exist. In some embodiments, the commerce platform 110 may provide a testing environment (e.g., livemode=false) and a production environment (e.g., livemode=true). For example, when livemode=false, objects may run credit card charges against a fake bank account which also applies to upgrades made through the customer portal 300 when created in the test environment.

The schema 400 may also include a reference to the configuration ID of the merchant's configuration settings 111A, the customer ID of the customer who wishes to access account management functions, and a "secret" value, which may comprise a unique string that is used to identify the portal session (in the example of FIG. 4A, the secret string is "TMBjAXtKtkOjUYB7Nj3 DXL6WyeocsJur"). The portal API 110B may utilize a random character generator or any other appropriate method to generate the secret string. The schema 400 may also include the return URL specified in the request (or in the configuration settings 111A). The portal session may have a limited duration that is preset (e.g., specified in the configuration settings 111A), such as 5 minutes for example. In this way, if the URL is leaked or if a malicious actor creates a number of duplicate portal session objects, they will not be able to gain unauthorized access to the customer's portal session for an extended period of time.

FIG. 4B illustrates an example of portal session object 150 created by the portal API 110B. As can be seen in FIG. 4B, the portal session object 150 may be based in part on the schema 400 of the portal session and may include a portal session URL (in the example of FIG. 4B: billing.stripe.com/session/TMBjAXtKtkOjUYB7Nj3 DXL6WyeocsJur) to the portal session. The portal API 110B may utilize the secret string created to identify the portal when constructing the portal session URL (in the example of FIG. 4B, the secret string is "TMBjAXtKtkOjUYB7Nj3 DXL6WyeocsJur"). In this way, the portal API 110B may ensure that all portal session URLs are globally unique (i.e., the URLs for a session is never re-used for another session, and every session gets a fresh, un-guessable URL). The portal session object 150 may also include its own object ID and object name, the customer ID of the customer who wishes to access account management functions, the livemode value, and the return URL specified.

As discussed herein, the portal session URL may have a limited duration that is preset (e.g., specified in the configuration settings 111A), such as 5 minutes for example. In this way, if the portal session URL is leaked or if a malicious actor creates a number of duplicate portal session objects, they will not be able to gain unauthorized access to the customer's portal session for an extended period of time. When the portal session object 150 is transmitted to the backend module 120A, the portal API 110B may initiate a timer based on the limited duration of the portal session. Thus, when a customer wants to visit the customer portal 300, backend module 120A may request creation of a new portal session and the portal API 110B may return a portal session object 150 including a temporary and unique link to a customer specific portal session of the customer portal 300.

Upon receiving the portal session object 150, the backend module 120A may analyze the portal session object 150 and create a new backend endpoint (not shown) that may function to redirect the customer to the portal session using the portal session URL. Upon creation of the backend endpoint, backend module 120A may instruct front end module 120B to redirect the customer to the backend endpoint, which in turn may redirect the customer to the portal session URL of the portal session.

Figure 5:
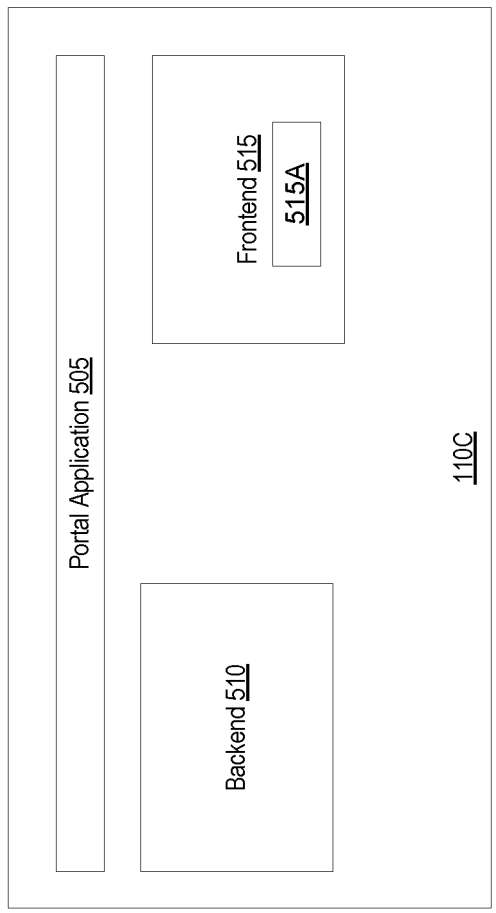
FIG. 5 is a block diagram illustrating a customer portal software module, in accordance with some embodiments of the present disclosure.

FIG. 5 illustrates a block diagram of the portal module 110C, which may include a portal application 505 which comprises a portal backend 510 and a portal frontend 515. The portal session URL may be a custom route (e.g., a Sinatra route) to billing.stripe.com/session/TMBjAXtKtkOjUYB7Nj3 DXL6WyeocsJur via a route middleware. A route may comprise an HTTP method/verb, such as GET or POST that is paired with a URL-matching pattern, e.g., the portal session URL. The route may match the web request sent by the customer (redirected via the backend endpoint of backend module 120A) to some code in the portal backend 510 that tells the portal backend 510 what data and templates to send back to the customer. In the example of FIGS. 4B and 5, the portal backend 510 may search for the portal session whose schema includes "TMBjAXtKtkOjUYB7Nj3 DXL6WyeocsJur" as its secret string. The portal backend 510 may return an error (e.g., "404") if the portal session specified in the portal session URL is not found. After the portal session URL is resolved, the portal backend 510 may validate that the portal session is not expired (e.g., by checking the timer initiated when portal session object 150 was transmitted to the backend module 120A), and may render a "this session has expired" hyper-text markup language (HTML) page if it has. If the portal session has not expired, the backend 510 may generate an ephemeral key for the portal session which is used for client-side authentication to perform functions requested by the customer e.g., updating a subscription. The backend 510 may also set any preloaded hash values to be used as configurations (feature flags, gates, etc.) for the load application 515A.

The backend 510 may render an HTML page having an embedded JSON document which includes basic information to bootstrap the portal front end 515 (including load application 515A). The load application 515A may render the UI of the customer portal 300. In some embodiments, the load application 515A may be a JavaScript application. In some embodiments, the UI of the customer portal 300 may reference a JavaScript library to match the current browser URL to render each of the subpages of the customer portal 300. To perform functions requested by the customer such as changes to subscriptions (e.g., updating, canceling, and previewing changes to them), the portal application 505 may make requests to internal endpoints using the portal session's ephemeral key for authentication. These endpoints may act as proxy layers between the portal application 505 and the underlying APIs that perform the relevant changes (e.g., in the backend 510). This abstraction hides the internals of how updating subscriptions works—the portal application 505 instructs the proxy layer to e.g., "update the subscription from A to B", and the proxy layer may translate that request based on the configuration settings the customer portal 300 is configured with (e.g., how to handle prorations) into the correct shape and invokes the API method directly. When a customer clicks a "return URL" link (which may also be embodied as the merchant's name or logo within the portal, for example) (not shown in the FIGS.), they're redirected to the return URL specified in the configuration settings.

Once the customer has made the necessary changes to their account, the portal application 505 may transmit notifications of these changes to the merchant system using one or more web hooks. More specifically, the backend module 120A of the merchant system 120 may instantiate one or more web hook endpoints, wherein each web hook endpoint has an associated URL (e.g., https://example.com/webhooks). The portal application 505 sends notifications of each change made during the portal session as an event object. Each event object is sent to the URL of a web hook endpoint on backend module 120A. Additionally, each event object includes all of the event details about the change that was made, including the type of event and the data associated with that event. The web hook endpoint uses the event details to take any required actions, such as indicating that an order should be fulfilled. Each event object may include the customer ID of the customer (or, in some embodiments, an ID for the subscription) so as to determine which customer the event applies to. The use of web hooks is particularly useful for events occurring within the customer portal 300 which are asynchronous (i.e., happening at a later time and not directly in response to execution of the relevant code).

As described herein, the customer portal 300 is launched via the merchant system 120's backend module 120A. Thus, if the merchant system 120 wishes to link to the customer portal 300 from an alternate source (e.g., an email), they would need to build an endpoint on their end to link to, which would then authenticate the customer, create a portal session, and then redirect to it. Stated differently, the merchant system 120 needs to hit their backend (which needs to talk to commerce platform 110) to obtain a portal session URL to the customer portal 300, instead of being able to hardcode it in their frontend. The reason for this is that the customer portal 300 cannot authenticate the customer on its own (e.g., does not have a way of knowing who the corresponding merchant or customer is). In addition, such authorization cannot be encoded in the portal session URL, since it would be easy to tamper with, and a malicious actor could modify the portal session URL to last indefinitely.

Thus, in some embodiments, when a customer logs into the admin panel/frontend module 120B of the merchant system 120, the merchant system 120 may call an endpoint of the commerce platform 110 (e.g., a customer session API) to generate a customer session thereon. The customer session may create a new object (e.g., mongo object) which may be referred to as e.g., "CustomerSession" that stores a randomly generated initiation token, an expiry date, and a cookie secret (also randomly generated). The endpoint of the commerce platform 110 may return the initiation token to the merchant system 120. The initiation token may have a short duration and may expire quickly. The merchant system 120 may call into an API of the commerce platform 110 to verify the initiation token, and then place a merchant namespaced cookie (e.g. portal_{mrchid}) including the cookie secret for that session on customer device 130 (e.g., on the customer's browser). If a cookie already exists on the customer device 130, the existing cookie may be overridden.

The customer portal 300 (https://billing.stripe.com/portal/{mrchid}) may then use the cookie secret from the portal_{mrchid} cookie to authenticate the customer and then redirect them to the portal session URL of the portal session. In this way, the rest of the merchant's frontend module 120B is not required to deal with creating a portal session, but instead it can redirect directly to the portal session URL (e.g., https://billing.stripe.com/portal/{mrchid}). To refresh the session, the merchant can get a new initiation token by calling the customer session API again.

Figure 6:
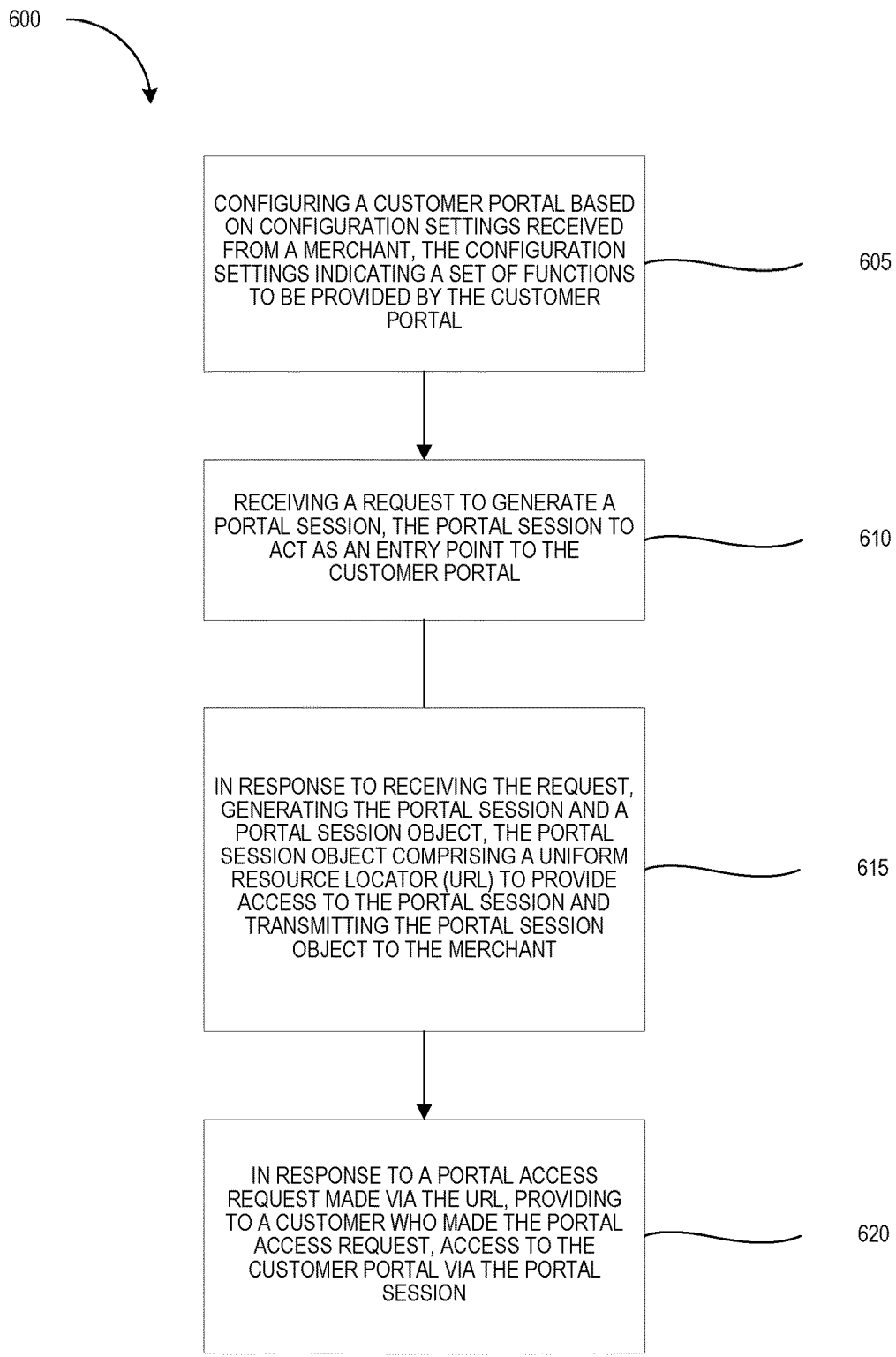
FIG. 6 is a flow diagram of a method for providing an end-to-end full stack customer portal, in accordance with some embodiments of the present disclosure.

FIG. 6 is a flow diagram of one embodiment of a method 600 for providing a customer portal. The method 600 is performed by processing logic that may comprise hardware (circuitry, dedicated logic, etc.), software (such as is run on a general-purpose computer system or a dedicated machine), firmware, or a combination thereof. In one embodiment, the method 600 is performed by a commerce platform (e.g., commerce platform 110 illustrated in FIGS. 2A and 2B).

Referring simultaneously to FIG. 2B, processing logic begins at block 605 by configuring a customer portal 300 based on configuration settings 111A received from a merchant system 120, the configuration settings 111A indicating a set of functions to be provided by the customer portal 300.

At block 610, processing logic may receive a request to generate a portal session, the portal session to act as an entry point to the customer portal. As discussed herein, the front-end module 120B may provide a UI which may provide various graphical representations of each function that a customer may utilize such as buttons or links etc. In response to a customer requesting to perform a function (e.g., by clicking or otherwise selecting the function's corresponding graphical representation), front end module 120B may make an API call to backend module 120A, which may make an API call to the portal API 110B requesting initiation of a portal session. In some embodiments, the backend module 120A may use a POST request to call the portal API 110B. The POST request may be a route that matches a web request sent by the merchant system 120 to some code in the portal API 110B that tells the portal API 110B what data to send back to the merchant system 120. The backend module 120A may include in the request to create a portal session a customer ID of the customer who wants to manage their account and a return URL, which may be the URL the customer will be redirected to upon completing their business in the customer portal 300 (e.g., in response to clicking an "exit" button while in the customer portal 300). In some embodiments, the merchant system 120 may provide a default return URL as part of the configuration settings 111A they specify through configuration module 110A as discussed herein.

At block 615, in response to receiving the request, the processing logic may generate the portal session and a portal session object, the portal session object comprising a uniform resource locator (URL) to provide access to the portal session and transmitting the portal session object to the merchant. A portal session may act as an entry point into the customer portal 300, and may have a limited duration (i.e., may expire after a pre-set amount of time). A portal session may provide a way for customers to access the customer portal 300 in a constrained way to promote security as discussed in further detail herein. The portal API 110B may act as a single endpoint that (in response to receiving the request to create a portal session) creates the portal session as well as generates and returns a portal session object 150 corresponding to the portal session to the backend module 120A. The portal API 110B may extract the customer ID and the return URL (if specified) from the request and generate the portal session the portal session object 150 based at least in part on the customer ID and the return URL (if specified). In some embodiments, the portal session may be a database model having a schema 400 as indicated in FIG. 4A.

Figure 7:
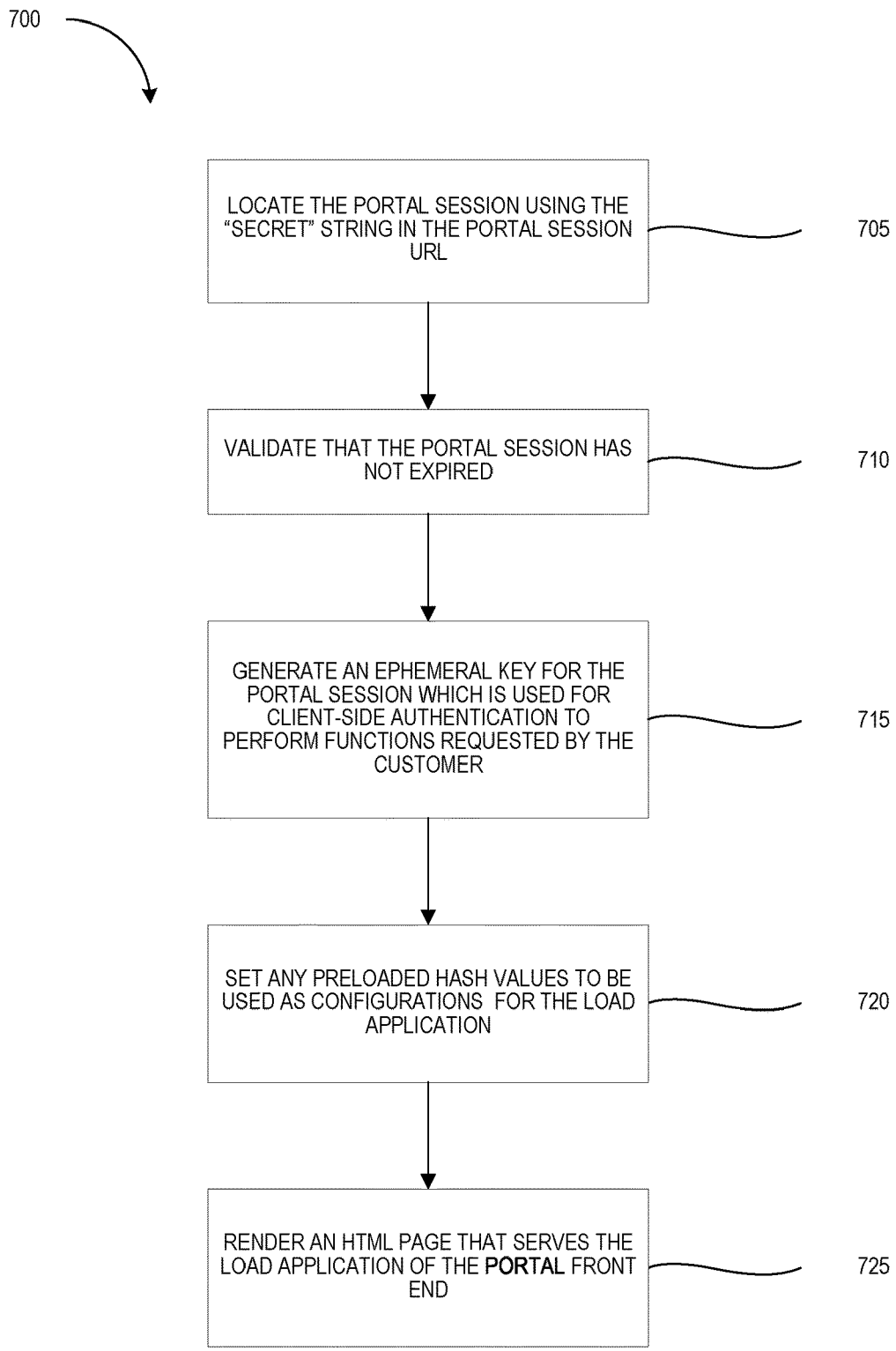
FIG. 7 is a flow diagram of a method for providing access to a customer portal via a portal session, in accordance with some embodiments of the present disclosure.

At block 620, in response to a portal access request made via the URL, the processing logic may provide to a customer who made the portal access request, access to the customer portal via the portal session as discussed in further detail with respect to FIG. 7.

FIG. 7 is a flow diagram of one embodiment of a method 700 for providing access to the customer portal via the portal session to a customer who made a portal access request. The method 700 is performed by processing logic that may comprise hardware (circuitry, dedicated logic, etc.), software (such as is run on a general-purpose computer system or a dedicated machine), firmware, or a combination thereof. In one embodiment, the method 700 is performed by a commerce platform (e.g., commerce platform 110 illustrated in FIGS. 2A and 2B).

Referring also to the examples of FIGS. 4B and 5, At block 705, the portal backend 510 may search for the portal session whose schema includes "TMBjAXtKtkOjUYB7Nj3DXL6WyeocsJur" as its secret string. The portal backend 510 may return an error (e.g., "404") if the portal session specified in the portal session URL is not found. After the portal session URL is resolved, the processing logic may load the portal session using the secret string in the portal session URL. In the example of FIGS. 4B and 5, the portal backend 510 may search for the portal session whose schema includes "TMBjAXtKtkOjUYB7Nj3DXL6WyeocsJur" as its secret string. The processing logic may return an error (e.g., "404") if the portal session specified in the portal session URL is not found. At block 710, After the portal session URL is resolved, the portal backend 510 may validate that the portal session is not expired (e.g., by checking the timer initiated when portal session object 150 was transmitted to the backend module 120A), and may render a "this session has expired" hypertext markup language (HTML) page if it has. If the portal session has not expired, at block 715 the processing logic may generate an ephemeral key for the portal session which is used for client-side authentication to perform functions requested by the customer e.g., updating a subscription. The processing logic may also, at block 720, set any preloaded hash values to be used as configurations (feature flags, gates, etc.) for the load application 515A.

At block 725, the processing logic may render an HTML page having an embedded JSON document which includes basic information to bootstrap the portal front end 515 (including load application 515A). The load application 515A may render the UI of the customer portal 300. In some embodiments, the load application 515A may be a JavaScript application. In some embodiments, the UI of the customer portal 300 may reference a JavaScript library to match the current browser URL to render each of the subpages of the customer portal 300. To perform functions requested by the customer such as changes to subscriptions (e.g., updating, canceling, and previewing changes to them), the portal application 505 may make requests to internal endpoints using the portal session's ephemeral key for authentication. These endpoints may act as proxy layers between the portal application 505 and the underlying APIs that perform the relevant changes (e.g., in the backend 510). This abstraction hides the internals of how updating subscriptions works—the processing logic instructs the proxy layer to e.g., "update the subscription from A to B", and the proxy layer may translate that request based on the configuration settings the customer portal 300 is configured with (e.g., how to handle prorations) into the correct shape and invokes the API method directly. When a customer clicks a "return URL" link (which may also be embodied as the merchant's name or logo within the portal, for example) (not shown in the FIGS.), the processing logic redirects them to the return URL specified in the configuration settings 111A.

Figure 8:
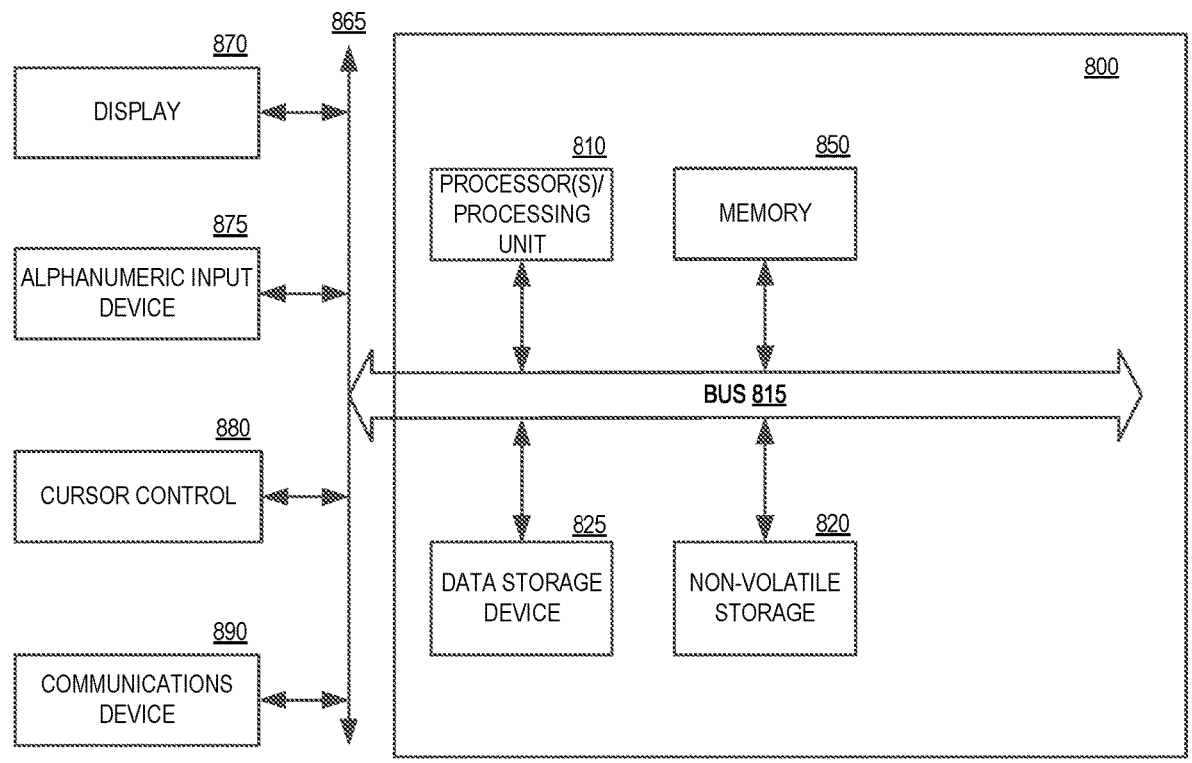
FIG. 8 is a block diagram of a computing device which may perform the methods and techniques for providing an end-to-end full stack customer portal, in accordance with some embodiments of the present disclosure.

FIG. 8 is one embodiment of a computer system that may be used to support the systems and operations discussed herein. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random-access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display, or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for providing access to a user portal, on behalf of a first system, comprising:
   receiving, from the first system, a configuration request comprising configuration settings;
   configuring the user portal using the configuration settings;
   receiving a session request to generate a portal session that acts as an application programing interface (API) endpoint for a set of functions;
   in response to receiving the session request:
      extracting, from the session request, a user identifier, a secret string, a URL, and a reference to the configuration settings, the URL uniquely associated with the portal session, the URL comprising a copy of the secret string; and
      generating the portal session and a portal session object;
   transmitting the portal session object to the first system; and
   in response to a portal access request made to the API endpoint via the URL by a user, providing access to the user portal via the portal session, comprising:
      determining that the secret string matches the copy of the secret string;
      determining that the portal session has not expired; and
      rendering a hyper-text markup language (HTML) page that serves an application, the application to load the portal session and render a user interface (UI) of the user portal.

2. The method of claim 1, wherein the configuration settings comprise:
   the set of functions to be provided to a session of the user portal;
   the user identifier;
   the secret string; and
   the URL, the URL comprising the secret string.

3. The method of claim 1, wherein a schema of the portal session comprises the user identifier, the secret string, the URL, and the reference to the configuration settings.

4. The method of claim 1, further comprising:
   receiving, at the API endpoint, an API call that requests performance of a function from the set of functions; and
   transmitting the received API call to one or more backend API endpoints, causing the one or more backend API endpoints to perform the function.

5. The method of claim 4, further comprising:
   translating, by the API endpoint, the received API call to one or more backend API endpoints.

6. The method of claim 1, further comprising:
   transmitting, to the first system, one or more event objects indicating changes to user data made, during the portal session, by execution of one or more of the set of functions.

7. The method of claim 1, wherein the session request is received by a single application program interface (API) that is configured to generate the portal session and the portal session object.

8. The method of claim 1, wherein the portal session provides access to the user portal for a pre-set amount of time before expiring.

9. A non-transitory computer-readable medium having instructions stored thereon which, when executed by a processor, cause the processor to:
   receive, from a first system, a configuration request comprising configuration settings;
   configure a user portal using the configuration settings;
   receive a session request to generate a portal session that acts as an application programing interface (API) endpoint for a set of functions;
   in response to receiving the session request:
      extract, from the session request, a user identifier, a secret string, a URL, and a reference to the configuration settings, the URL uniquely associated with the portal session, the URL comprising a copy of the secret string; and
      generate the portal session and a portal session object;
   transmit the portal session object to the first system; and
   in response to a portal access request made to the API endpoint via the URL by a user, provide access to the user portal via the portal session, comprising:
      determining that the secret string matches the copy of the secret string;
      determining that the portal session has not expired; and
      rendering a hyper-text markup language (HTML) page that serves an application, the application to load the portal session and render a user interface (UI) of the user portal.

10. The non-transitory computer-readable medium of claim 9, wherein the configuration settings comprise:
    the set of functions to be provided to a session of the user portal;
    the user identifier;
    the secret string; and
    the URL, the URL comprising the secret string.

11. The non-transitory computer-readable medium of claim 9, wherein a schema of the portal session comprises the user identifier, the secret string, the URL, and the reference to the configuration settings.

12. The non-transitory computer-readable medium of claim 9, wherein the instructions further cause the processor to:
    receive, at the API endpoint, an API call that requests performance of a function from the set of functions; and transmit the received API call to one or more backend API endpoints, causing the one or more backend API endpoints to perform the function.

13. The non-transitory computer-readable medium of claim 12, wherein the instructions further cause the processor to:
translating, by the API endpoint, the received API call to one or more backend API endpoints.

14. The non-transitory computer-readable medium of claim 9, wherein the instructions further cause the processor to:
transmit to the first system, one or more event objects indicating changes to user data made by execution of one or more of the set of functions within the user portal and during the portal session.

15. The non-transitory computer-readable medium of claim 9, wherein the session request is received by a single application program interface (API) that is configured to generate the portal session and the portal session object, and wherein the portal session provides access to the user portal for a pre-set amount of time before expiring.

16. A system comprising:
a memory that stores configuration settings indicating a set of functions to be provided by a user portal; and
a processor coupled with the memory, the processor configured to:
receive, from a second system, a configuration request comprising the configuration settings;
configure the user portal using the configuration settings;
receive a session request to generate a portal session that acts as an application programing interface (API) endpoint for the set of functions;
in response to receiving the session request:
extract, from the session request, a user identifier, a secret string, a URL, and a reference to the configuration settings, the URL uniquely associated with the portal session, the URL comprising a copy of the secret string; and
generate the portal session and a portal session object;
transmit the portal session object to the second system; and
in response to a portal access request made to the API endpoint via the URL by a user, provide access to the user portal via the portal session, comprising:
determining that the secret string matches the copy of the secret string;
determining that the portal session has not expired; and
rendering a hyper-text markup language (HTML) page that serves an application, the application to load the portal session and render a user interface (UI) of the user portal.

17. The system of claim 16, wherein the configuration settings comprise:
the set of functions to be provided to a session of the user portal;
the user identifier;
the secret string; and
the URL, the URL comprising the secret string.

18. The system of claim 16, wherein a schema of the portal session comprises the user identifier, the secret string, the URL, and the reference to the configuration settings.

19. The system of claim 16, further comprising the processor configured to:
receive, at the API endpoint, an API call that requests performance of a function from the set of functions; and
transmit the received API call to one or more backend API endpoints, causing the one or more backend API endpoints to perform the function.

20. The system of claim 19, further comprising the processor configured to: translate, by the API endpoint, the received API call to one or more backend API endpoints.

* * * * *